United States Patent
Gaebler

(10) Patent No.: US 9,233,621 B2
(45) Date of Patent: Jan. 12, 2016

(54) BATTERY SYSTEM AND METHOD FOR IDENTIFYING UNAUTHORIZED MODULE REPLACEMENT IN A BATTERY SYSTEM

(71) Applicants: Robert Bosch GmbH, Stuttgart (DE); Samsung SDI Co., Ltd., Yongin-si, Gyeonggi-do (KR)

(72) Inventor: Sven Gaebler, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 180 days.

(21) Appl. No.: 14/010,313

(22) Filed: Aug. 26, 2013

(65) Prior Publication Data

US 2014/0062385 A1  Mar. 6, 2014

(30) Foreign Application Priority Data

Aug. 28, 2012 (DE) .......................... 10 2012 215 208

(51) Int. Cl.
*H02J 7/00* (2006.01)
*B60L 11/18* (2006.01)

(52) U.S. Cl.
CPC ......... *B60L 11/1838* (2013.01); *B60L 11/1822* (2013.01); *B60L 11/1846* (2013.01); *B60L 11/1864* (2013.01); *B60L 2270/34* (2013.01); *Y02T 10/7005* (2013.01); *Y02T 10/7011* (2013.01); *Y02T 10/7061* (2013.01); *Y02T 10/7072* (2013.01); *Y02T 90/121* (2013.01); *Y02T 90/124* (2013.01); *Y02T 90/128* (2013.01); *Y02T 90/14* (2013.01); *Y02T 90/163* (2013.01); *Y02T 90/169* (2013.01); *Y04S 30/14* (2013.01)

(58) Field of Classification Search
CPC ............ Y02T 10/7005; Y02T 10/7011; Y02T 10/705; Y02T 10/7044; Y02T 10/7055; Y02T 90/16; B60L 11/1822; H02J 7/1423; G06F 21/44; G06F 21/64; H01M 2010/4271
USPC .......................................................... 320/106
See application file for complete search history.

(56) References Cited

U.S. PATENT DOCUMENTS

| | | | |
|---|---|---|---|
| 2010/0121511 A1* | 5/2010 | Onnerud et al. | 701/22 |
| 2013/0169038 A1* | 7/2013 | King | 307/10.1 |

FOREIGN PATENT DOCUMENTS

| | | |
|---|---|---|
| CN | 102386651 A | 3/2012 |
| DE | 10 2009 000 504 A1 | 8/2010 |

* cited by examiner

*Primary Examiner* — Vuthe Siek
(74) *Attorney, Agent, or Firm* — Maginot, Moore & Beck LLP

(57) ABSTRACT

A battery system includes a central battery management controller and a plurality of battery modules, which each have a module controller, and a readout device configured to read information. Within a scope of a start initialization, start identification features of the module controllers are detected by the battery management controller and are provided to the module controllers as future reference for identifying an unauthorized battery module replacement, and information relating to an occurred unauthorized battery module replacement is read by the readout device, which is arranged outside of the battery system.

8 Claims, 1 Drawing Sheet

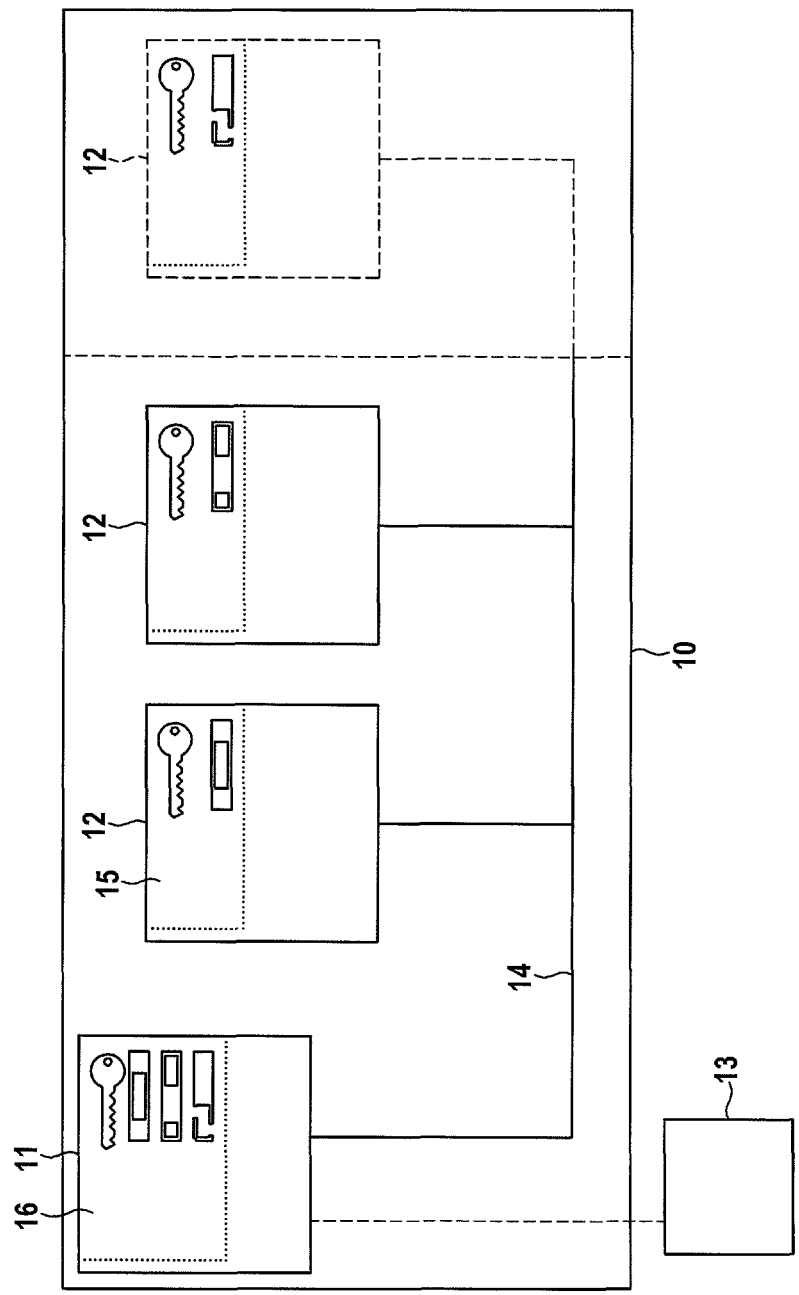

BATTERY SYSTEM AND METHOD FOR IDENTIFYING UNAUTHORIZED MODULE REPLACEMENT IN A BATTERY SYSTEM

This application claims priority under 35 U.S.C. §119 to patent application no. DE 10 2012 215 208.3, filed on Aug. 28, 2012 in Germany, the disclosure of which is incorporated herein by reference in its entirety.

BACKGROUND

The present disclosure relates to a battery system, which comprises a central battery management controller and a multiplicity of battery modules, which each have a module controller, and a readout device for reading information. Within the scope of a start initialization, start identification features of the module controllers are detected by the battery management controller and provided to the module controllers as future reference for identifying an unauthorized module replacement. Information relating to an occurred unauthorized battery module replacement is read by the readout device arranged outside of the battery system.

The disclosure furthermore relates to a method for identifying an unauthorized module replacement in a battery system, which serves to carry out the disclosure according to the disclosure.

It is becoming apparent that stationary applications such as wind power plants, motor vehicles designed as hybrid or electric motor vehicles, and electronic devices such as laptops or mobile telephones will in future employ novel battery systems which have placed upon them very high demands in terms of reliability, safety, performance and service life. Lithium ion batteries promise to have a key role in electrifying the drive system.

Lithium ion batteries are employed in many ways it due to the relatively high energy density. Lithium ion technology is predestined for a broad field of use in applications. It is distinguished, inter alia, by high energy density and a very low self discharge.

In the prior art, high-voltage battery systems consist of, inter alia, several cells connected by design and an associated sensor cluster/control unit (module controller, MC) and a central control unit (battery management controller, BC). The battery management controller and the module controllers are connected to one another by a bus system. Within the scope of servicing/repair, it is possible to replace one or more modules as well as the module controller.

DE 10 2009 000 504 A1 discloses a battery module with battery cells, microcontrollers and a control unit, which comprises a device for detecting a state of at least one battery cell and at least one means for transmitting at least one signal from the battery module to outside of the battery module and/or from outside of the battery module to the battery module, wherein the at least one signal is associated with at least one specific battery cell and the at least one signal can be associated with the at least one specific battery cell by means of at least one identification code.

SUMMARY

One or more problems in the prior art are remedied or at least reduced by the present disclosure. According to the disclosure, a battery system is provided, which comprises a central battery management controller and a multiplicity of battery modules, which each have one module controller, and a readout device for reading information. Characterizing for this is that, within the scope of a start initialization, start identification features of the module controller are detected by the battery management controller and provided to the module controller as future reference for identifying an unauthorized module replacement. Information relating to an occurred unauthorized battery module replacement is read by the readout device arranged outside of the battery system.

In the present disclosure, the battery is a lithium ion battery. By using lithium ion technology, it is possible to obtain particularly high energy storage densities, which leads to further advantages, particularly in the field of electro-mobility.

The disclosure is based on the discovery that, in accordance with the present disclosure, the identification of an unauthorized replacement of battery modules is made possible. An unauthorized replacement of battery modules can lead to liability and/or guarantees and should therefore, if not be prevented, at least be identified.

Battery modules, in particular the cells contained therein, largely determine the power of a battery, depending on the calendrical and use-dependent wear.

The advantage of the present disclosure is that the simple replacement of battery modules is part of servicing and/or repairing a battery. A further advantage is that an unauthorized battery module replacement in a battery system is identified.

According to an advantageous embodiment of the disclosure, each module controller has a unique start identification feature. As a result of this, an unauthorized battery module replacement can advantageously be identified unambiguously.

According to a preferred embodiment of the disclosure, provision is made for the start identification feature to be able to be processed by software arranged on the module controller. The advantage here is that, by processing the start identification feature, servicing and/or repair is exactly verifiable.

In accordance with a further preferred embodiment of the disclosure, provision is made for the start identification feature of the module controllers to be transmitted to the battery management controller by an internal bus system. As a result of this, the information in relation to a possible unauthorized battery module replacement can advantageously be read easily by the readout device.

In a particular embodiment of the disclosure, provision is furthermore made for the start identification feature of the module controllers and of the battery management controller to be stored in a protected region. The advantage here is that the start identification feature cannot be manipulated by third parties trying to hide a possible replacement of a battery module.

Alternatively, provision is advantageously made for the readout device for reading the information in relation to an occurred unauthorized battery module replacement to be connected to the battery management controller. As a result, the readout of the information in relation to an occurred unauthorized battery module replacement can advantageously be simplified.

Provision is additionally made for a motor vehicle with a drive system which comprises the battery system according to the disclosure.

The present disclosure also relates to a method for identifying an unauthorized battery module replacement in a battery system with a central battery management controller and a multiplicity of battery modules, which each have a module controller, comprising the following steps:

detecting start identification features of the module controllers by the battery management controller as future reference within the scope of a start initialization, comparing operation identification features of the module controllers by the battery management controller with reference values detected during the start initialization, reading the information in relation to an occurred unauthorized battery module replacement by a readout device arranged outside of the battery system.

An advantage of the method is that an unauthorized battery module replacement is identified.

Advantageous developments of the disclosure are specified in the dependent claims and described in the description.

BRIEF DESCRIPTION OF THE DRAWINGS

An exemplary embodiment of the disclosure is explained in more detail on the basis of the drawing and the following description. In detail:

The FIGURE shows an identification of an unauthorized battery module replacement in a battery system.

DETAILED DESCRIPTION

The FIGURE shows a schematic illustration of the battery system 10 according to the disclosure. The battery system 10 comprises a central battery management controller 11 and a multiplicity of battery modules, which each have a module controller 12. In the FIGURE, the module controllers 12 of MC1, . . . , MCn can be seen. Moreover, the battery system 10 has a readout device 13, which serves to read information.

A unique start identification feature, which can be processed by the software arranged on the module controller 12, is introduced into each module controller 12 during the production process. The start identification feature of the module controller 12 is transmitted to the battery management controller 11 via an internal bus system 14. Moreover, the start identification feature of the module controller 12 and of the battery management controller 11 is stored in a protected region 15, 16. This serves primarily to make manipulations more difficult. The readout device 13, which serves to read the information in relation to an occurred unauthorized battery module replacement, is connected to the battery management controller 11.

Within the scope of a start initialization, start identification features of the module controller 12 are detected by the battery management controller 11 and provided to the module controllers 12 as future reference for identifying an unauthorized battery module replacement. Information relating to an occurred unauthorized battery module replacement is then read by the readout device 13 arranged outside of the battery system 10.

The FIGURE furthermore shows a method for identifying an unauthorized battery module replacement in a battery system 10 with a central battery management controller 11 and a multiplicity of battery modules, which each have a module controller 12. First, start identification features of the module controller 12 are detected by the battery management controller 11 as future reference within the scope of a start initialization. Next, after a successful completion of the start initialization, operation identification features of the module controllers 12 are compared to the reference values detected during the start initialization by the battery management controller 11, for example during servicing or repair. If an intolerable deviation emerges during these comparisons for one or more module controllers 12, this is identified as an unauthorized battery module replacement and corresponding information is provided for further processing in the battery management controller 11. The information in relation to an occurred unauthorized battery module replacement is read by the readout device 13 arranged outside of the battery system 10.

Within the scope of reliability, it is recommended to carry out an appropriate reaction only after multiple unsuccessful tests. Particularly in the case of repeating tests, the transmission of the individual start identification features can be dispensed with in favor of a derived form of said individual start identification feature of the module controller 12. This also makes manipulation more difficult since the start identification feature only has to be transmitted during the start initialization after production or servicing and/or repair. The derivation of the start identification feature can in this case be selected in such a way that, although the derivation can be calculated with little effort, the reversal, i.e. the conclusions in respect of the start identification feature in its original form, however constitutes significant effort.

What is claimed is:

1. A battery system comprising:
   a central battery management controller;
   a plurality of battery modules, each battery module including a module controller; and
   a readout device configured to read information, the readout device being located outside of the battery system,
   wherein within a scope of a start initialization, start identification features of the module controllers are detected by the central battery management controller and are provided to the module controllers as future reference for identifying an unauthorized battery module replacement, and
   wherein information relating to an occurred unauthorized battery module replacement is read by the readout device.

2. The battery system according to claim 1, wherein each module controller includes a unique start identification feature.

3. The battery system according to claim 1, wherein the start identification features are configured to be processed by software arranged on the module controllers.

4. The battery system according to claim 1, wherein the start identification features of the module controllers are transmitted to the battery management controller by an internal bus system.

5. The battery system according to claim 1, wherein the start identification features of the module controllers and of the battery management controller are stored in a protected region.

6. The battery system according to claim 1, wherein the readout device is connected to the battery management controller.

7. A motor vehicle comprising:
   a drive system including a battery system, the battery system having (i) a central battery management controller, (ii) a plurality of battery modules, each battery module including a module controller, and (iii) a readout device configured to read information, the readout device being located outside of the battery system,
   wherein within a scope of a start initialization, start identification features of the module controllers are detected by the central battery management controller and are provided to the module controllers as future reference for identifying an unauthorized battery module replacement, and
   wherein information relating to an occurred unauthorized battery module replacement is read by the readout device.

8. A method for identifying an unauthorized battery module replacement in a battery system including a central battery management controller and a plurality of battery modules, each battery module of the plurality of battery modules including a module controller, the method comprising:
- detecting start identification features of the module controllers with the battery management controller as future reference within a scope of a start initialization;
- comparing operation identification features of the module controllers with the battery management controller with reference values detected during the start initialization; and
- reading information in relation to an occurred unauthorized battery module replacement with a readout device arranged outside of the battery system.

* * * * *